United States Patent [19]

Van Exel

[11] 4,066,329

[45] Jan. 3, 1978

[54] OPTICAL ADJUSTMENT KNOB WITH SPACED APART PLATFORMS

[75] Inventor: Gerrit A. Van Exel, Fullerton, Calif.

[73] Assignee: Bausch & Lomb Incorporated, Rochester, N.Y.

[21] Appl. No.: 620,969

[22] Filed: Oct. 9, 1975

[51] Int. Cl.² ........................... G02B 7/06; G02B 7/04
[52] U.S. Cl. ......................................... 350/77; 350/44
[58] Field of Search ................... 350/145, 146, 35, 36, 350/41, 44, 46, 47, 255, 74–77; D6/59

[56] References Cited

U.S. PATENT DOCUMENTS

| D. 240,268 | 6/1976 | Hunkenback | D16/59 |
|---|---|---|---|
| 3,540,792 | 11/1970 | Akin | 350/77 |

FOREIGN PATENT DOCUMENTS

| 381,879 | 11/1964 | Switzerland | 350/255 |
|---|---|---|---|
| 9,204 | 3/1897 | United Kingdom | 350/77 |

*Primary Examiner*—Jon W. Henry
*Attorney, Agent, or Firm*—Christie, Parker & Hale

[57] ABSTRACT

A center-focus binocular with a focus knob having a flattened upper surface which is easily contacted by fingertips on both hands of the user when the binocular is held in a normal viewing position. The knob motion is like that of a treadle or seesaw, and the user's finger motion is dominantly linear and opposite. The fingers of opposite hands apply opposing forces to the knob for smooth and accurate movement, and the knob is coupled to ocular lenses of the binocular through a steep cam for rapid, short-stroke focus adjustment.

12 Claims, 7 Drawing Figures

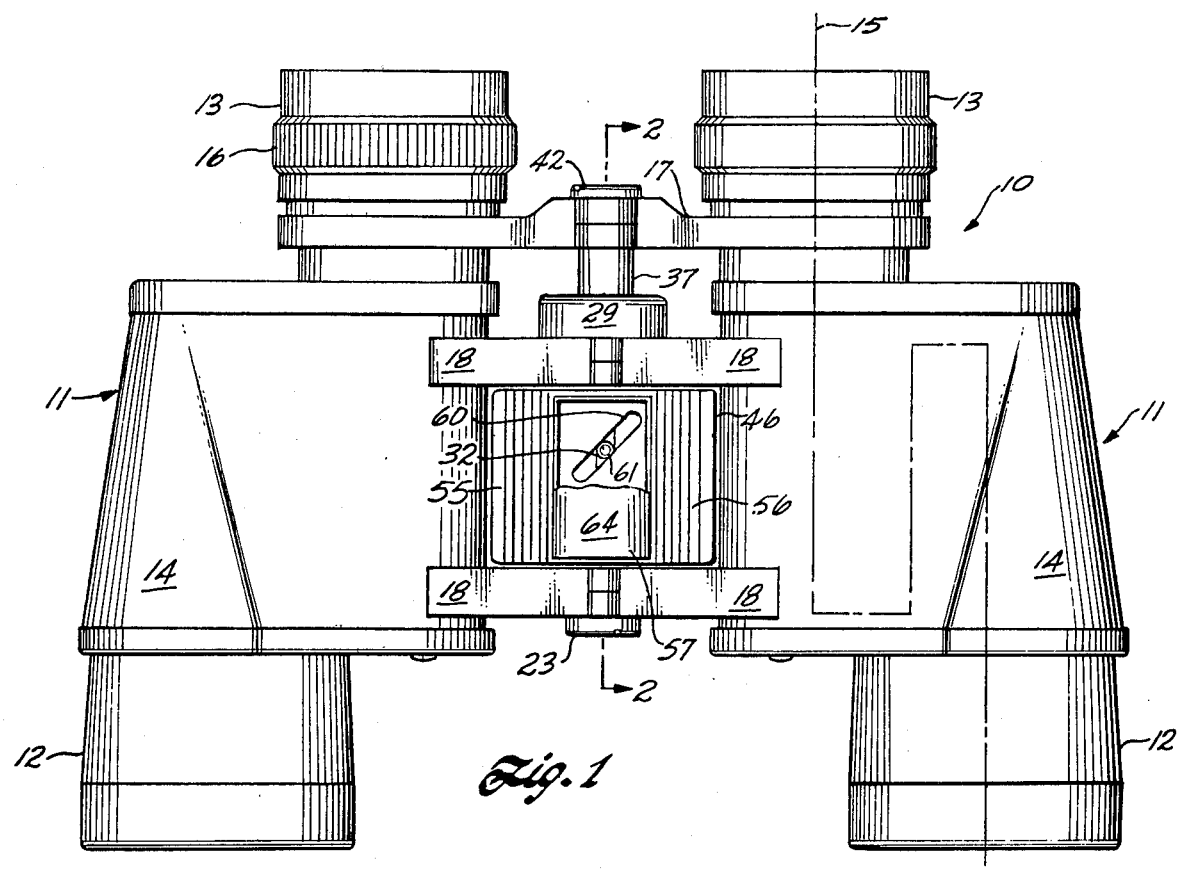
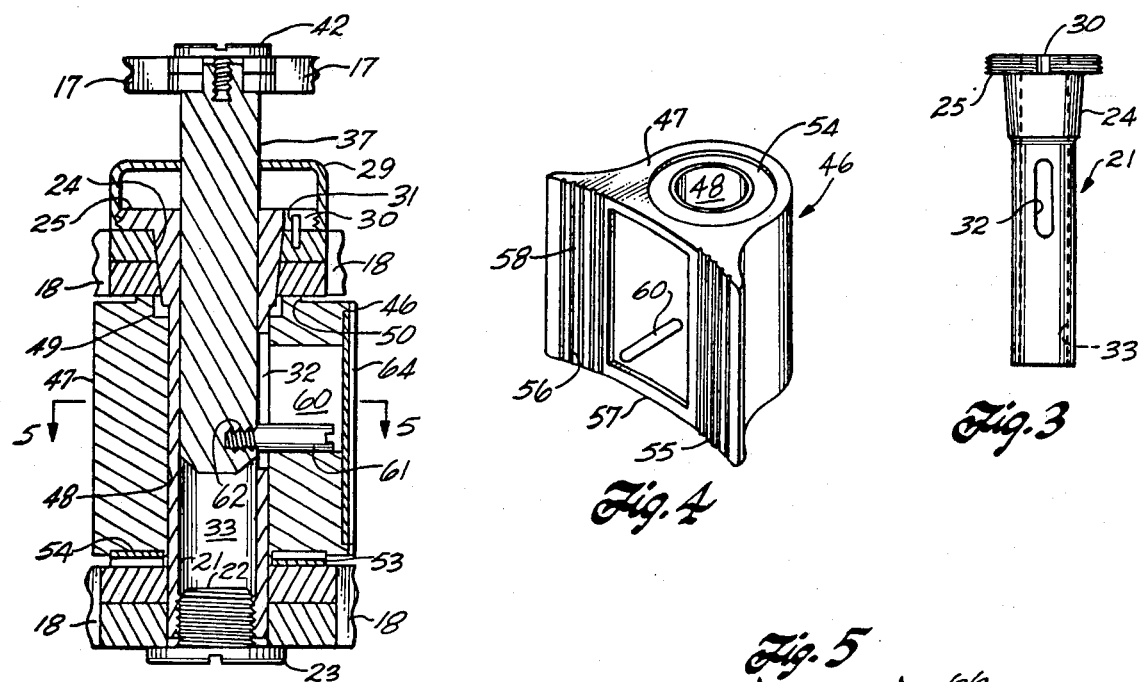

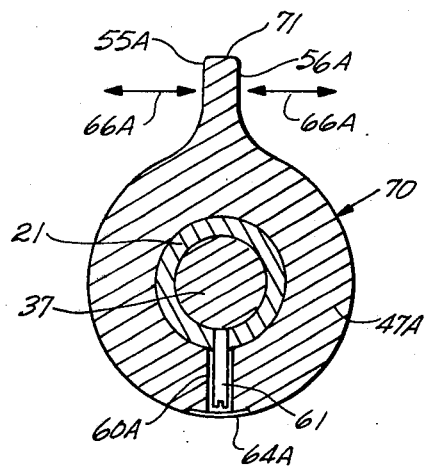
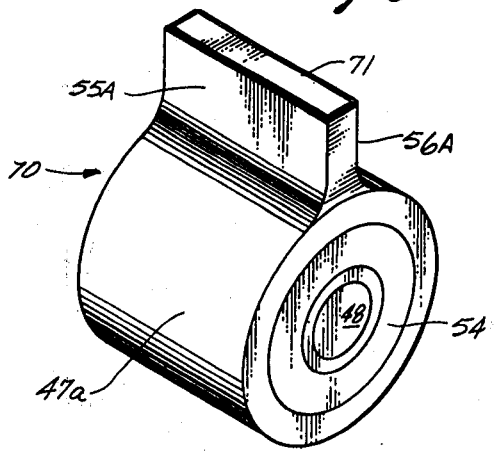

OPTICAL ADJUSTMENT KNOB WITH SPACED APART PLATFORMS

BACKGROUND OF THE INVENTION

Conventional binoculars are focused on objects at different distances from the viewer by rotating a round knob or focus wheel which adjusts the position of ocular lenses until the magnified image appears sharp. Many binocular users have difficulty in making this adjustment because the focus knob is slow and cumbersome to operate, and often requires the hands to be awkwardly shifted from a normal gripping position in order to rotate the knob.

Precise focus is also difficult for many people to achieve in a single adjustment due to the inherent tendency of the eye to "force" a slightly de-focused image into focus. This action arises from an unconscious distortion of the eye's crystalline lens to achieve sharpness of the retinal image. The crystalline lens will "lead" a slow focus adjustment, and accurate adjustment is sometimes not accomplished until the binocular has been removed from and returned to the eyes several times.

These problems are recognized and discussed in greater detail in U.S. Pat. No. 3,540,792, the disclosure of which is incorporated herein by reference. The solution shown in this patent is a short-stroke focus ring which is rotatably mounted on one of the ocular-lens housings.

I have found that many binocular users are better able to achieve accurate focusing if the fingers of both hands are used to make the adjustment, and if the fingers apply opposing forces to the control or focus knob of the focus mechanism. The fingers of the user's one hand apply a force to drive the control knob in one direction, and the fingers of the user's other or second hand apply an opposite retarding force which tends to minimize overshoot and makes the adjustment smooth.

If the control knob is driven past a position of sharp focus, the fingers of the second hand are positioned to return the knob to a correct position immediately and without any shift in grip positioning of the hands. Even persons skilled in the adjustment of optical instruments find this opposed-force arrangement comfortable because they typically tend to make several rapid sweeps of decreasing amplitude through sharp focus in order to zero in on a correct adjustment.

The binocular herein described uses a centrally positioned focus control knob which differs from a conventional center-focus wheel in several ways. First, the knob is coupled to the ocular lenses by a steep cam or similar means which provides ocular movement through a full focusing range with only a relatively small movement of the knob. Second, the upper surface of the control knob is generally flattened and laterally extended to form a treadle- or seesaw-like "rocker" knob having platform surfaces which fall naturally under the user's fingertips when the binocular is held in the normal way. These surfaces are on opposite sides of the axis of rotation of the knob so movement of the fingertips is opposite and dominantly vertical during focus adjustment, and accurate focus is achieved without loss of the steadying grip of both hands on the binocular. In another form, the finger-contacting platform surfaces are arranged as substantially parallel opposite side surfaces of a tab which extends radially from the knob rotation axis.

SUMMARY OF THE INVENTION

Briefly stated, this invention relates to an improved optical adjustment knob having a pair of generally flattened platforms arranged to be contacted by the fingers of the user's hands which are moved substantially linearly and oppositely to rotate the knob and thereby to move an optical element in a telescope. In one form, the knob is incorporated in a binocular having a pair of conventional monocular telescopes connected by a frame which includes brackets secured to the telescopes and centrally coupled by a hinge pin. The knob includes a hub which is rotatably mounted on the frame between the telescopes. Further, the knob has a generally flattened finger-contacting portion forming a pair of spaced-apart platforms which are generally horizontal when the knob is centered and the binocular is held in the normal viewing position. The platforms are on opposite sides of the hub rotation axis so the knob can be rotated by substantially linear and opposite vertical motion of fingers positioned on the two platforms. The knob is connected by a coupling means, such as a bridge member and pin, to the movable optical focusing elements, such as lenses, in the telescopes.

Preferably, the coupling means also includes a steep cam means connected between the bridge pin and knob to effect full-range movement of the movable lenses by a short rotational stroke of the knob. In a preferred form, the cam means includes a cam pin secured to and extending radially from the bridge pin through an axial slot in the hinge pin and a cam slot in the knob, the cam slot extending to an outer surface of the knob so the cam pin is externally accessible during assembly or servicing of the binocular.

DESCRIPTION OF THE DRAWINGS

FIG. 1 is a plan view of a binocular according to the invention;

FIG. 2 is a section on line 2—2 of FIG. 1;

FIG. 3 is a plan view of a hinge pin;

FIG. 4 is a perspective view of an adjustment knob;

FIG. 5 is a section on line 5—5 of FIG. 2;

FIG. 6 is a perspective view of an alternative knob; and

FIG. 7 is a section similar to FIG. 5 but showing the alternative knob.

DESCRIPTION OF THE PREFERRED EMBODIMEMT

A prism binocular 10 according to the invention is shown in FIG. 1, and is of generally conventional construction except for the focus adjusting mechanism described in detail below. Binocular 10 includes a pair of monocular prism telescopes 11 each having an objective lens housing 12 and an ocular lens housing 13 mounted at opposite ends of a central body 14 which contains and supports the usual prisms (not shown). The path of light rays passing through the telescopes is shown by dashed line 15 which also defines the optical axes of the objective and ocular lenses.

One of the ocular lens housings includes an individualeyepiece focus ring 16 used to compensate for any dioptric difference between the user's eyes. Both ocular lens housings 13 are conventionally mounted to be axially movable with respect to bodies 14 for adjustment of focus, and the ocular housings are connected by a conventional centrally hinged bridge member 17 so they move together during focusing. Bodies 14 are similarly coupled together by conventional centrally hinged brackets 18. Central hinging of these connecting elements enables the monocular telescopes to be moved toward or away from each other to provide the usual interpupillary-spacing adjustment for the binocular.

Referring to FIGS. 2 and 3, the inner end of each body bracket 18 is bored to receive a hollow and generally cylindrical hinge pin 21. The forward end of pin 21 which is positioned between the objective-lens housings is internally threaded to receive a retaining screw 22 having a flange 23 bearing against forwardmost brackets 18. The rear end of pin 21 includes a tapered portion 24 received in a mating tapered bore through each of rear bracket members 18. The rear end of pin 21 also defines a radially extending flange 25 which seats against the back surface of rear bracket members 18.

Flange 25 is externally threaded to receive a cover cap 29. The flange also includes a radially extending slot 30 which receives an index pin 31 rigidly secured to one of rear brackets 18. A straight axially extending slot 32 is formed through the wall of the central portion of pin 21 to open into a cylindrical internal bore 33 through the pin.

Ocular-lens bridge member 17 is slidably coupled to hinge pin 21 by a bridge pin 37 which extends through a central opening in cover cap 29 to make a slip fit in bore 33 of the hinge pin. The rear end of the bridge pin is reduced in diameter to extend into a circular opening in the bridge member. The bridge pin and bridge member are secured together by a flanged-head retaining screw 42.

A focus knob 46 (FIGS. 1, 2, 4 and 5) is preferably an integrally molded plastic body, but can also be a machined or molded metallic part. Knob 46 includes a central hub 47 positioned between bodies 14 of the monocular telescopes. A central cylindrical bore 48 extends through the hub to receive hinge pin 21 as shown in FIG. 2. An annular recess 49 is formed in the rear face of the hub around bore 48 to provide clearance for the forward end of tapered portion 24 of the hinge pin. An annular boss 50 (FIG. 2) is integrally formed on the rear face of hub 47 adjacent recess 49, and the boss provides a bearing surface for the knob as it is rotated with respect to rear brackets 18.

An annular wave spring 53 is positioned between the forward end of hub 47 and front brackets 18, and the spring seats in a recess 54 in the front face of the hub. Spring 53 urges boss 50 against rear brackets 18, and increases the torsional resistance of hub 47 to rotation on hinge pin 21. This frictional drag is important to insure that a focus setting of the binocular will not be disturbed when the ocular lens housings are pressed against the user's head.

The upper surface of the knob is laterally extended to define a pair of spaced-apart platforms 55 and 56 joined by a flat central portion 57. The upper surfaces of platforms 55 and 56 preferably define a plurality of axially extending ribs 58 for better contact with the user's fingers. The upper surface of the knob is generally flattened, but is preferably slightly concavely curved when viewed in an axial direction for better finger access and for improved appearance.

A cam slot 60 slopes at an angle of about 40° with respect to the rotational axis of the knob, and extends from the upper surface of central portion 57 into bore 48 of the hub. A cam pin 61 (FIG. 2) has a cylindrical upper surface, and a threaded lower end received in a mating threaded hold 62 adjacent the forward end of bridge pin 37. The cylindrical body of the cam pin extends upwardly through slot 32 in the hinge pin, and is axially movable in this slot. The cam-pin body also extends upwardly into cam slot 60 of knob 46. The upper end of the cam pin is slotted to receive a screwdriver. A decorative rectangular cover plate 64 is cemented in a mating recess in the upper surface of central portion 57 of the knob to cover the cam pin and cam slot after the binocular is assembled.

In operation, binocular 10 is gripped by the user in the normal fashion with the fingers of the right and left hands extending toward each other over the top of telescope bodies 14. If focusing is necessary, the fingertips are rested on platforms 55 and 56, and the knob is rotated by pressing one of the platforms down. The fingers which rest on the other platform can impart a slight resistance to the upward movement of this other platform during knob rotation, permitting a smooth but rapid adjustment of focus. If the user overshoots a position of correct focus, rotation of the knob is simply reversed by applying a downward force to the other platform.

The movement of knob hub 47 is rotational, but the action sensed by the user's fingers is dominantly linear and vertical (as suggested by arrows 66 in FIG. 5) when the binocular is held in a normal horizontal viewing position. I have found that this action is natural and comfortable for most binocular users, and that they are able to achieve fast and accurate focusing without difficulty, and while maintaining a steadying two-handed grip on the binocular body.

When the knob is rotated by the dominantly vertical motion of the user's fingers, cam pin 61 is driven along cam slot 60, and bridge pin 37 is, accordingly, moved axially within hinge pin 21. Movement of the bridge pin is transmitted to bridge member 17 which in turn imparts an axial movement to the coupled ocular lenses. Rapid short-stroke focusing is achieved by the steepness of cam slot 60 with respect to the rotational axis of the knob, a knob rotation of about 40 degrees being sufficient to displace the ocular lenses axially about 3/16-inch through a full focusing range.

A significant advantage of this construction is that binocular assembly is quick and simple, and disassembly for repair purposes can also be rapidly accomplished. The binocular is assembled by inserting hinge pin 21 through brackets 18 and knob 46 to hinge the two monocular telescopes together. The hinge pin is positioned to place pin 31 within slot 30 to insure that slot 32 is in proper rotational alignment. The hinge pin is secured in place with retaining screw 22, and cover cap 29 is also then installed.

Bridge pin 37 is then connected to the ocular bridge member 17 as shown in FIG. 2, and the bridge pin is then slipped into bore 33 of the hinge pin to position threaded hole 62 beneath slot 32 and cam slot 60. Cam pin 61 is then installed through slots 32 and 60 to be threaded securely into hole 62. Cover plate 64 is cemented in place to complete the assembly operation. The ready access to the cam pin which is provided by extending cam slot 60 to the upper surface of the knob enables the binocular to be easily assembled or disassembled without special jigs or fixtures by simply removing cover plate 64.

The invention also contemplates use of an alternative form of rapid-action knob 70 as shown in FIGS. 6–7. Knob 70 has a hub 47A substantially corresponding to hub 47, with the exception that a cam slot 60A and cover plate 64A are positioned in the lower rather than the upper surfaces of the hub. Extending radially from the hub is a tab 71, and the opposite side surfaces of the tab define a pair of generally flattened and parallel platforms 55A and 56A. As suggested by arrows 66A in FIG. 7, the platforms are contacted by a pair of opposed fingers while the binocular is normally gripped, and a substantially linear and opposite motion of the fingers effects bidirectional rotation of the knob for rapid and accurate short-stroke focusing.

There has been described a center-focus binocular which permits rapid and accurate focusing by a comfortable and dominantly vertical motion of the user's fingertips. The telescopes used in the binocular are conventional, and the novel central hinge and focus cam mechanism can be readily adapted to a number of different styles of binoculars. The cam mechanism can also be used to control magnification in a "zoom" binocular by coupling the bridge member to appropriate optical elements in each telescope. Similarly, the knobs described above are useful to control movable optical elements in monocular instruments such as spotting telescopes and the like.

What is claimed is:

1. A binocular comprising:
   a. first and second telescopes, each of the telescopes including a body portion and a movable optical element, the optical elements being movable with respect to the body portions to effect an optical adjustment;
   b. connecting means secured to the body portions for connecting the telescopes together and to provide an interpupillary spacing adjustment for the telescopes, the means including a hinge pin having a longitudinal axis and a bracket hinged to rotate about the hinge pin;
   c. an assembly for moving the optical elements, the assembly including a rotatable knob and a coupling means for coupling the knob to the movable optical elements, the knob including a hub portion which is mounted between the body portions for rotation about the longitudinal axis of the hinge pin, the knob also including first and second spaced-apart finger-contacting portions spaced relative to the hub portion so that, when the binocular is held by a user with one of the user's hands gripping the first telescope and the other of the user's hands gripping the second telescope, the first finger-contacting portion is positioned relative to the first telescope so as to be easily contacted by at least one finger of the one hand and the second finger-contacting portion is positioned relative to the second telescope so as to be easily contacted by at least one finger of the other hand whereby the knob can be rotated bidirectionally in seesaw-like fashion by the fingers of the hands without any shift in grip positioning of the hands.

2. The binocular defined in claim 1 wherein the coupling means includes a bridge member connecting the movable optical elements, a bridge pin secured to and extending from the bridge member, and a cam means operatively connected between the bridge pin and the knob for driving the bridge pin in response to knob rotation.

3. The binocular defined in claim 2 wherein the cam means includes a cooperating cam pin and cam slot, and wherein the cam pin is supported on one of the bridge pin or knob and the cam slot is provided on the other of the bridge pin or knob.

4. The binocular defined in claim 3 wherein the cam slot is provided on the knob and the cam pin is secured to and extends radially from the bridge pin into engagement with the cam slot.

5. The binocular defined in claim 4 wherein the hinge pin is hollow and the bridge pin extends into the hollow hinge pin.

6. The binocular defined in claim 5 wherein the hinge pin has an axially extending slot therein, the knob is rotatably mounted on the hinge pin and the cam pin extends through the hinge pin slot.

7. The binocular defined in claim 6 wherein the cam slot has at least a portion extending to an outer surface of the knob, whereby the cam pin can be inserted through the cam slot and hinge pin slot into engagement with the bridge pin when the knob is rotatably mounted on the hinge pin.

8. The binocular defined in claim 6 wherein the cam slot is oriented at an angle of about 40° to the longitudinal axis.

9. The binocular defined in claim 6 wherein the finger-contacting portions are elongated in a direction parallel to the longitudinal axis so that the first finger-contacting portion may be easily contacted by at least two fingers of one hand and the second finger-contacting portion may be easily contacted by at least two fingers of the other hand.

10. The binocular defined in claim 6 wherein the finger-contacting portions are generally coplanar.

11. The binocular defined in claim 6 wherein the movable optical elements are focusing lenses.

12. The binocular defined in claim 6 wherein the means for connecting the movable optical elements with the bridge pin includes a hinged bridge member.

* * * * *